United States Patent
Karl

(10) Patent No.: US 10,471,948 B2
(45) Date of Patent: Nov. 12, 2019

(54) MOTOR CONTROL FOR HYBRID ELECTRIC VEHICLES

(71) Applicant: AUDI AG, Ingolstadt (DE)

(72) Inventor: Bernhard Karl, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/989,722

(22) Filed: May 25, 2018

(65) Prior Publication Data

US 2019/0023258 A1    Jan. 24, 2019

(30) Foreign Application Priority Data

Jul. 24, 2017    (DE) .......................... 10 2017 212 642

(51) Int. Cl.
| | | |
|---|---|---|
| *B60W 20/12* | (2016.01) | |
| *B60W 20/13* | (2016.01) | |
| *B60W 10/06* | (2006.01) | |
| *B60W 10/08* | (2006.01) | |
| *B60W 20/40* | (2016.01) | |
| *B60W 50/08* | (2012.01) | |

(52) U.S. Cl.
CPC ............ *B60W 20/12* (2016.01); *B60W 10/06* (2013.01); *B60W 10/08* (2013.01); *B60W 20/13* (2016.01); *B60W 20/40* (2013.01); *B60W 50/082* (2013.01); *B60W 2510/244* (2013.01); *B60W 2540/04* (2013.01); *B60W 2550/402* (2013.01); *B60W 2710/0677* (2013.01); *B60W 2710/086* (2013.01); *Y10S 903/93* (2013.01)

(58) Field of Classification Search
None
See application file for complete search history.

(56) References Cited

U.S. PATENT DOCUMENTS

| | | |
|---|---|---|
| 6,283,086 B1 | 9/2001 | Yamamoto et al. |
| 2009/0287366 A1 | 11/2009 | Davis et al. |
| 2010/0280687 A1 | 11/2010 | Tate, Jr. et al. |
| 2012/0072066 A1 | 3/2012 | Kato et al. |
| 2012/0197468 A1 | 8/2012 | Frederick et al. |
| 2014/0365057 A1 | 12/2014 | Arita et al. |
| 2015/0197235 A1 | 7/2015 | Yu |
| 2015/0217752 A1 | 8/2015 | Rueger |
| 2015/0314776 A1 | 11/2015 | Yu |
| 2016/0176394 A1 | 6/2016 | Geller |
| 2017/0008513 A1 | 1/2017 | Itagaki |
| 2017/0072937 A1 | 3/2017 | Kapadia et al. |
| 2019/0001959 A1* | 1/2019 | Schlumpp ......... B60W 50/0097 |

FOREIGN PATENT DOCUMENTS

| | | |
|---|---|---|
| DE | 10 2010 039 653 A1 | 2/2012 |
| DE | 10 2014 119 373 A1 | 7/2015 |
| DE | 10 2015 201 825 A1 | 8/2015 |
| DE | 10 2015 203 491 A1 | 9/2016 |
| DE | 10 2016 214 150 A1 | 2/2018 |
| EP | 2363312 A2 | 9/2011 |

OTHER PUBLICATIONS

German Office Action dated Jun. 4, 2018, in connection with corresponding DE Application No. 10 2017 212 642.6 (10 pgs.).
Search Report dated Jul. 30, 2018 in corresponding European Application No. 18171376.9; 9 pages.
German Examination Report dated May 28, 2019, in connection with corresponding German Application No. 10 2017 212 642.6 including partial machine-generated English language translation; 7 pages.

* cited by examiner

*Primary Examiner* — Rodney A Butler

(74) *Attorney, Agent, or Firm* — Maier & Maier, PLLC

(57) ABSTRACT

A method for controlling the drivetrain for hybrid electric vehicles and a corresponding drive system.

10 Claims, No Drawings

MOTOR CONTROL FOR HYBRID ELECTRIC VEHICLES

FIELD

The invention relates to a method for controlling the drivetrain for hybrid electric vehicles as well as a corresponding drive system.

BACKGROUND

For hybrid electric vehicles with EV mode (purely electric driving), a startup of the internal combustion engine automatically occurs for a remaining electric range of travel of 0 km. In this case, it often happens that a startup of the internal combustion engine occurs a few meters just before the vehicle is parked. This is detrimental to the internal combustion engine and the environment and aggravating for the vehicle operator.

Against this background, the present invention is based on the object of preventing such situations.

Disclosed in US 2017/008513 A1 is a control unit for a hybrid vehicle, with which the hybrid vehicle prevents a startup of the internal combustion engine in specific situations in order to avoid the creation of noise. Such situations can be, for example, the presence of pedestrians in the vicinity of the vehicle, certain times of day, certain locations or zones, such as parking garages, narrow streets, or the vicinity of the dwelling of the driver. The vehicle recognizes the situations via sensors, timers, or GPS.

U.S. Pat. No. 6,283,086 B1 discloses a motor control unit for a hybrid vehicle, for which the hybrid vehicle recognizes when it is situated in a zone with traffic congestion and prevents a start-stop operation of the internal combustion engine in the traffic congestion.

EP 2 363 312 A2 teaches a control system for a hybrid vehicle, which starts the lubrication system of an internal combustion engine of the hybrid vehicle on the basis of data about the surroundings and the location and provides for a constantly good lubrication of the internal combustion engine even after a prolonged period of inactivity.

The known systems do not take into consideration the state of charge of the traction battery of the hybrid vehicle. When the indicator for the remaining range of travel of the electric drive drops to zero, the internal combustion engine of the vehicle is started even when this is, in fact, not desired.

However, an indication of a remaining range of travel of 0 km does not mean that the battery is completely discharged. In order to optimize the service life of the HV battery, only a portion of the battery capacity is utilized—for example, 20 to 80% of the total capacity. For an indication of a remaining range of travel of 0 km, the HV battery is therefore still charged, for example, to 20%. In accordance with the invention, the service life of the HV battery is weighed against the service life of the internal combustion engine and, in special cases, the battery is "overloaded" in order to prevent a startup of the internal combustion engine and thereby to protect the internal combustion engine and the environment.

SUMMARY

In accordance with the invention, a startup of the internal combustion engine shortly before reaching a travel destination is prevented by using data from a navigation instrument and by utilizing an actually blocked battery capacity of the traction battery. The utilization of the blocked battery capacity should not take place too extensively, because the service life of the traction battery would otherwise greatly decrease.

The subject of the invention is a method for operating a hybrid electric vehicle, the drivetrain of which comprises an internal combustion engine (ICE) and at least one electric motor (EM). A startup of the internal combustion engine is suppressed when the vehicle is in purely electric driving mode (EV mode) and the driving distance to a destination point of the vehicle is less than a predetermined route distance.

DETAILED DESCRIPTION

In an embodiment, the driving distance is less than 5 km—for example, less than 1 km. In another embodiment, the driving distance is less than 500 m or even less than 100 m.

In another embodiment, the driving distance is greater than the displayed remaining range of travel of the vehicle in EV mode. In one embodiment, the driving distance is up to 1 km or even up to 5 km greater than the displayed remaining range of travel.

In another embodiment of the method, the startup suppression of the ICE is activated depending on the distance of the vehicle from a predetermined position (for example, "home," "workplace," etc.). Via the home position (home address) entered in the navigation instrument, it can be established that 10 m before the target destination, for example, a startup of the internal combustion engine should no longer occur, because it is highly likely that the vehicle will soon be charged. In this case, the reserve capacity of the traction battery is to be utilized. The loss of service life of the battery is minimal in comparison to the loss of service life of the internal combustion engine owing to a short-distance operation.

In another variant, route data are analyzed and utilized for the method. If, for example, a commuting route to work is known, which comprises starting from the charging point at home, an always identical route to work, and parking at a charging station in the parking garage, then, for example, it can be established that no startup of the ICE is to occur when the vehicle is situated within a 100 m radius of the parking garage or of home. In one embodiment, the navigation system recognizes that the vehicle is situated on a route stored in memory, such as, for example, the commuting route to work.

In another embodiment of the method, the residual charge of a traction battery of the vehicle is smaller than a predetermined minimum value that triggers a startup of the internal combustion engine. In one embodiment, said minimum value is 20% of the battery capacity of the traction battery. The minimum value can, however, also take on other values, depending on the battery system employed. Thus, it can be greater than or less than 20%—for example, 25% or 30% or even only 15% or 10%. In automatic operation, the control system of the hybrid electric vehicle starts the internal combustion engine as soon as the system-internal predetermined minimum value is reached or drops below it, in order that the traction battery does not suffer any damage due to deep discharging and can be recharged once again in driving operation.

The subject of the invention is also a drive system for a hybrid electric vehicle, comprising an internal combustion engine (ICE) and at least one electric motor (EM) for driving the vehicle. In addition, the system includes a control unit, which is set up for the purpose of regulating the power output of the ICE and of the at least one EM. The regulation of the power output of the ICE includes starting up and turning off the ICE. The control unit is set up to receive and to process data of a navigation instrument. In one embodiment, the data of the navigation instrument comprise at least one current vehicle position and one current travel destination of the vehicle. In another embodiment, the data comprise the remaining route of travel (driving distance) to a current travel destination of the vehicle and, in another embodiment, the remaining driving distance is calculated by the control unit.

In one embodiment of the drive system, the control instrument is set up to no longer start up the ICE before reaching the travel destination when the driving distance to the travel destination is less than a predetermined value. In one embodiment, the predetermined value lies in the range of 100 m to 5 km—for example, 1 km or 500 m or 100 m.

In another embodiment of the drive system, the control instrument is set up to no longer start up the ICE before reaching the travel destination even when the residual charge of a traction battery of the vehicle is smaller than a predetermined value triggering a startup of the internal combustion engine.

In another embodiment of the drive system, the control instrument is set up to no longer start up the ICE when there is a particular input of the driver. Through activation of the function by a particular input, such as, for example, activation of a switch provided for this purpose, the driver can suppress the startup of the ICE when he wants to operate the vehicle further in EV mode because, for example, he wants to take a short break, he is just then driving toward a parking space, or the like.

Advantages of the invention comprise the prolongation of the service life of the ICE and the saving of energy by preventing detrimental short startups, reducing emissions (exhaust and noise), and increasing customer satisfaction by way of an optimized EV mode.

The invention claimed is:

1. A method for operating a hybrid electric vehicle, comprising:
   a drivetrain with an internal combustion engine and at least one electric motor, wherein a start of the internal combustion engine is suppressed when the vehicle is in an electric driving mode and a driving distance to a destination point of the vehicle is less than a predetermined route distance,
   wherein the internal combustion engine is set up to no longer be started up before reaching the travel destination when the driving distance to the travel destination is less than a predetermined value.

2. The method according to claim 1, in which the driving distance is less than 1 km.

3. The method according to claim 2, in which the driving distance is less than 500 m.

4. The method according to claim 3, in which the driving distance is less than 100 m.

5. The method according to claim 1, wherein the driving distance is greater than a displayed remaining range of travel of the vehicle in the electric driving mode.

6. The method according to claim 1, wherein a residual charge of a traction battery of the vehicle is less than a predetermined minimum value triggering a startup of the internal combustion engine.

7. The method according to claim 6, in which the minimum value is 20% of the battery capacity of the traction battery.

8. A drive system for a hybrid electric vehicle, comprising:
   an internal combustion engine and at least one electric motor for driving the vehicle;
   a control unit, which is set up to regulate the power output of the internal combustion engine and of the at least one electric motor, which includes starting up and turning off the internal combustion engine, wherein the control unit is set up to receive and process data of a navigation instrument,
   wherein a control instrument is set up to no longer start up the internal combustion engine before reaching the travel destination when the driving distance to the travel destination is less than a predetermined value.

9. The drive system according to claim 8, wherein the control instrument is set up to no longer start up the internal combustion engine before reaching the travel destination when the driving distance to the travel destination is less than a predetermined value.

10. The drive system according to claim 8, wherein the control instrument is set up to no longer start up the internal combustion engine when there is a particular input of the driver.

* * * * *